April 14, 1970   W. B. OFFUTT   3,506,838
PHOTOELECTRIC DEFECT DETECTOR RESPONDING TO
INEQUALITY OF RESIDUAL CHARGES ON PAIRS
OF CAPACITORS CONNECTED TO PAIRS
OF PHOTOCELLS
Filed Feb. 2, 1962

*INVENTOR.*
WARREN B. OFFUTT

BY *Henry Huff*
ATTORNEY.

United States Patent Office 3,506,838
Patented Apr. 14, 1970

3,506,838
PHOTOELECTRIC DEFECT DETECTOR RESPONDING TO INEQUALITY OF RESIDUAL CHARGES ON PAIRS OF CAPACITORS CONNECTED TO PAIRS OF PHOTOCELLS
Warren B. Offutt, Centerport, N.Y., assignor to Cutler-Hammer, Inc., Milwaukee, Wis., a corporation of Delaware
Filed Feb. 2, 1968, Ser. No. 702,602
Int. Cl. G01n 21/16, 21/32
U.S. Cl. 250—219                    4 Claims

ABSTRACT OF THE DISCLOSURE

Inspection apparatus having photosensitive means controlling the discharge rate of a capacitor which periodically is charged to a given quantity of charge. The intensity of light incident on the photosensitive detector from a path intercepted by a moving web changes in accordance with any change in light transmitting or reflecting properties of the web passing through the path, thus changing the discharge rate of the capacitor during a relatively long interval between recurrent charging pulses. The amount of charge added to the capacitor by a relatively short-duration charging pulse is a function of the discharge of the capacitor during the preceding much longer interpulse interval and provides an output signal whose magnitude is indicative of the properties, such as defects, of that portion of the web that passed through the light path. Balanced circuit arrangements of capacitors are used in the preferred embodiment of moving web inspection apparatus.

BACKGROUND OF THE INVENTION

Field of the invention

The invention relates to electro-optic means for detecting imperfections in a web of moving material, and more particularly relates to novel means for producing an enhanced signal in response to an observed imperfection.

Description of the prior art

Many different types of arrangements are known in the art for detecting imperfections in a moving web of material such as paper, cloth, metal, or plastic. In one arrangement commonly used, a plurality of photosensitive detectors are located transversely of the direction of movement of the web and a source of a given radiation, such as light, is positioned so that it is transmitted through or reflected from the web and onto the detectors. An imperfection in the web will cause either an increase or decrease in the intensity of the given radiation received by one or more detectors, thus producing a signal in an electrical circuit in which the one or more photo detectors is connected. This signal is amplified and actuates an indicator, an alarm, or other apparatus so that appropriate action may be taken. It is required that inspection apparatus for use in a paper mill, for example, be capable of detecting small defects having a dimension of the order of one-eighth inch in the direction of travel of the web. With a defect of this small size, and with a web moving at a speed of several thousand feet per minute, the change in radiation at a photosensitive detector caused by such a defect very likely will be of small magnitude and short duration. Consequently, the electrical signal produced by the photodetector will be of similar nature, characterized by a low signal-to-noise ratio. To obtain a usable signal, a high gain amplifier and signal filter circuits commonly are employed. Because of the environment in which the equipment is operating, many types of spurious signal are to be expected, and the high gain amplifier of sufficient bandwidth is particularly sensitive to them.

A web of paper being inspected may be as wide as five feet or more, and each photodetector, in effect, "looks" at but a small region of the moving web, so that many photo-detectors, amplifiers and associated circuitry are required. Because of the amount of electronic equipment involved, and because it must be relatively high quality circuitry to properly function with the small input signals, the overall web inspection equipment is expensive to build and skilled labor is required to maintain it in proper operating condition.

SUMMARY OF THE INVENTION

In accordance with the present invention, electrical signal enhancement is achieved without the necessity of using high gain amplifiers and filter networks by utilizing a technique in which a change in light intensity on a photosenstive detector produces a rate of discharge of a charged capacitor which is a function of the intensity of the light incident on the photosensitive detector. The discharge rate of the capacitor is altered for the entire time interval during which the imperfection in the moving web is within the region viewed by the photosensitive detector. Periodically the capacitor is recharged to full capacity by a short pulse of current whose duration is much shorter than the time interval between charging pulses. The magnitude of the charge added to the capacitor during the very short charging interval is monitored to provide a pulsed output signal that is used to indicate the presence of an imperfection. The capacitor is recharged at such a frequency that an imperfection is within the view of a photosensitive detector for at least one complete interval between charging pulses. In this manner, the amplitude of the pulsed output signal is proportional to the charge lost by the capacitor during the entire, and much longer, interpulse period of discharge, thus producing an integration-type signal enhancement.

In the preferred embodiment of the inspection apparatus of this invention, a plurality of photosensitive detectors and capacitors are used. Each capacitor and its associated photosensitive detector operates as described above, and pairs of the capacitor are connected in a balanced circuit arrangement. The output of the balanced arrangement is a pulse that represents the difference in charging currents added to the two capacitors by respective charging pulses. Any difference in charging currents arises from the fact that one of the associated photosensitive detectors 'saw" an imperfection, or "saw" it for a longer period of time, and thus caused its capacitor to be discharged more or less than other capacitor during the preceding interpulse interval. The photosensitive detectors associated with a pair of capacitors receive light from respective paths that intercept the moving web at non-coincident regions.

DESCRIPTION OF THE PREFERRED EMBODIMENTS

Figure 1:
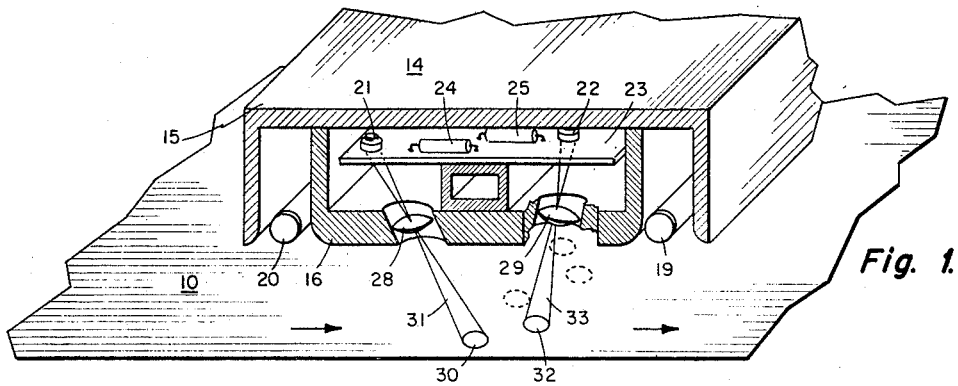
FIG. 1 is a simplified perspective view, partially broken away, illustrating the arrangement of apparatus for practicing the present invention.

A physical arrangement of inspection apparatus in which the present invention may be incorporated is illustrated in simplified form in FIG. 1. A web 10 of a material such as paper is moved by appropriate means in the direction from left to right. The web of paper 10 may be of any width and might be as wide as five feet or more. Positioned above the web 10 and extending throughout its entire width is the inspection apparatus 14 which includes an outer housing member 15 and an inner housing member 16. Positioned between the housing members 15 and 16, and extending throughout the width and slightly beyond the edges of the moving web are sources of radiation such as fluorescent light tubes 19 and 20 which flood the surface of the web with light. For very wide webs, arrays of fluorescent tubes may be positioned at the respective locations indicated by the tubes 19 and 20. Photosensitive detectors 21 and 22 are mounted on an electrical circuit board 23 supported within inner housing member 16. Additional electrical circuit components such as illustrated at 24 and 25, and which are included in the electrical circuit to be described herebelow, also are mounted on circuit board 23. An optical lens 28 is positioned within inner housing member 16 to direct light reflected from a region 30 on the surface of the moving web along a path 31 onto photosensitive detector 21. A second lens 29 is similarly arranged to direct light reflected from a region 32 on the surface of the web along the path 33 to photosensitive detector 22. The regions 30 and 32 are transversely adjacent each other and provide continuous uninterrupted observation of the web throughout the regions 30 and 32. The region 32 is positioned slightly in advance of the region 30 for reasons that will be explained herebelow. Additional photosensitive detectors and lens (not illustrated) are positioned at regular intervals throughout the length of circuit board 23 and inner housing member 16 in order to receive light from successive regions across moving web 10 to provide coverage of the entire width of the web.

In the arrangement illustrated in FIG. 1, the light directed to the photosensitive detectors is the light reflected from the surface of moving web 10. Alternatively, the light sources 19 and 20 could be placed on the opposite side of the moving web 10 so that any light received by the photosensitive detectors positioned as described above would be transmitted through the web.

Figure 2:
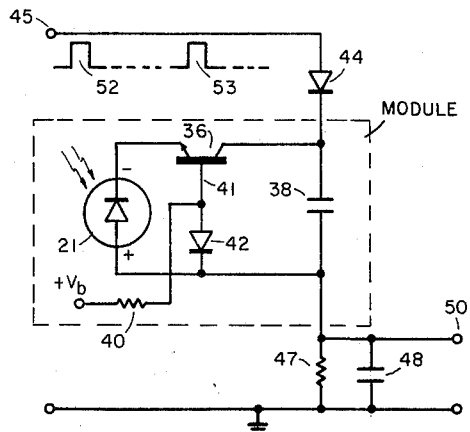
FIG. 2 is a schematic circuit diagram used in describing the principle involved in the present invention.

The electrical circuitry associated with the photosensitive detectors for providing an indication of an imperfection in the moving web 10 is illustrated in its basic form in FIG. 2. The photocell 21 and the transistor 36 are connected in a shunt path around the capacitor 38. A source of positive bias voltage $V_b$ is connected through the resistor 40 to the base electrode 41 of the transistor. Diode 42 establishes a bias voltage level on the base electrode 41. The photosensitive detector 21 is assumed in this example to be a solar cell device that generates a voltage and a current whose magnitudes are a function of the intensity of the light incident thereon. The solar cell is arranged in the base-emitter circuit of N-P-N transistor 36 so that the generated voltage and current have the polarity shown to render the transistor more conductive as the intensity of the light incident on the solar cell increases and less conductive as the intensity of the light decreases.

Capacitor 38 is periodically charged to a fixed voltage level through the diode 44 by means of a low impedance source of current pulses that is connected to input terminal 45. Output resistor 47 and output capacitor 48 are connected between the charging capacitor 38 and ground, and an output signal is taken from the output terminal 50.

In the operation of the circuit of FIG. 2, a current pulse 52 is supplied from input terminal 45 through diode 44 to cause a fixed quantity of charge to be stored by charging capacitor 38. The collector-emitter circuit of transistor 36 and the photosensitive detector 21 comprise a discharge path around capacitor 38 which discharges the capacitor at a rate which is dependent upon the state of conduction of transistor 36. The conduction state of transistor 36 is controlled by the voltage established in its base-emitter circuit by the solar cell 21, this voltage being a function of the light that is reflected onto the solar cell from the region 30 on the moving web of FIG. 1. An imperfection in the web, such as a hole, will cause less light to be reflected onto the solar cell 21.

It may be seen that any imperfection that is detected by the solar cell 21 has the effect of changing the rate of discharge of the charging capacitor 38 so that the amount of charge that is added to capacitor 38 by the next charging pulse 53 provides an indication of whether or not a imperfection in the web has passed the region 30 during the preceding interpulse interval. When charging capacitor 38 is recharged to its fixed quantity of charge by the recharging pulse 53, a current will flow through resistor 47 which is proportional to the amount of charge added to charging capacitor 38. The voltage across resistor 47 therefore is an indication of the amount of charge lost by charging capacitor 38 during the interval between charging pulses 52 and 53, and thus is a function of the amount of light reflected from the region 30 and directed onto photocell 21. The output of the circuit is taken at output terminal 50. Capacitor 48 is not essential to the operation of the circuit, but may be included to provide an output pulse of longer duration than may be obtained from resistor 47 alone.

The pulse repetition rate of the charging pulses is chosen so that the interpulse interval during which capacitor 38 is discharged is many times longer than the duration of a charging pulse. As a result of this feature, an integration-type effect is achieved whereby a relatively large amplitude, short-duration output pulse is obtained from a relatively low average discharge current that discharges capacitor 38 throughout the much longer interpulse interval.

The circuit parameters of the circuitry illustrated in FIG. 2 are chosen so that charging capacitor 38 is never permitted to completely discharge during an interpulse interval. Furthermore, the pulse repetition rate of the charging pulses applied to charging capacitor 38 is so proportioned with respect to the rate of travel of the moving web 10 that any imperfection in the web that passes through the region 30 will be within that region for a period of time equal to at least two interpulse intervals. In this way it is certain that the discharge rate for capacitor 38 will be charged throughout one complete interpulse interval so that a clear, easily discerned signal indicative of an imperfection will be obtained at output terminal 50. Representative values of parameters establishing these time relations are as follows:

Rate of travel of moving web 10—2,000 feet per minute
Charging pulse repetition rate—2,000 pulses per second
Interpulse interval—500 microseconds
Charging pulse duration—5 microseconds It is seen from these examples that the interpulse interval during which charging capacitor 38 is discharged is on hundred times longer than the duration of a charging pulse. Expressed differently, all of the charge that was drained from capacitor 38 in the 500 microsecond interpulse interval is restored in the 5 microsecond pulse period. This is the feature that assures a large amplitude output signal that has minimum noise.

The operation of the defect-detecting circuitry just described affords a decided advantage over prior art circuitry that provided an output signal directly in response to the momentary increase or decrease in light resulting from an imperfection passing through the path of light directed to a photosensitive detector. In this prior art technique the output signal was of small magnitude and high gain broadband amplifiers were required to obtain a signal of usable level. These amplifiers are expensive, subject to malfunction, and sensitive to spurious signals. In the present invention, the integration-type effect obtained by permitting the charging capacitor to discharge throughout an entire interpulse interval, and obtaining the large amplitude output signal that results from recharging the capacitor by the shot-duration charging pulse, obviates the need for high gain broadband amplifiers. The savings in cost, the reduced manufacturing and maintenance efforts, as well as the increased circuit reliability, are obvious.

In the circuit illustrated in FIG. 2, appropriate means may be connected to output terminal 50 to provide an indication when an output pulse deviates from a fixed magnitude, thus indicating the detection of a defect. Because of possible flutter of the moving web, change in coloration of the web, or changing values of circuit parameters and line voltages, spurious signals and conditions may make it difficult to achieve substantially error-free determination of defects. To avoid these difficulties, a balanced arrangement of circuits of the type illustrated in FIG. 2 may be provided. This presently preferred embodiment of the invention is illustrated in FIG. 3 wherein each of the blocks labeled "Module," and having an accompanying numeric-alphabetic designation, is intended to include the circuitry contained within the rectangle formed by dashed lines and designated "Module" in FIG. 2.

Figure 3:
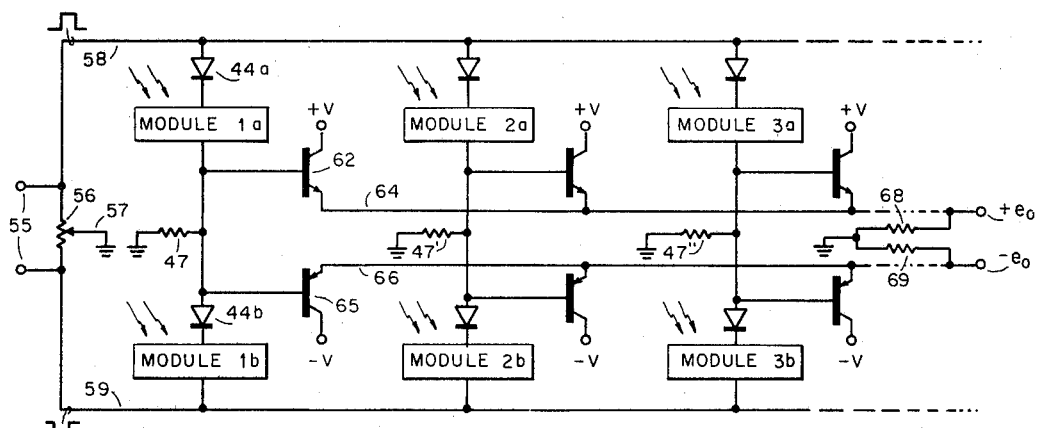
FIG. 3 is a simplified schematic circuit diagram of a preferred embodiment of the present invention.

In FIG. 3, recurrent pulses from a low impedance source are applied to input terminals 55 which are across the resistor 56. The grounded center tap 57 provides a balanced input whereby positive polarity pulses are applied over input line 58 and negative polarity pulses are applied over input line 59. As previously mentioned, modules 1a and 1b are identical to the module of FIG. 2, and the values of the charging capacitors in the modules are substantially identical. Both modules share a common output circuit comprised of resistor 47, this being the same as a similarly numbered resistor that is shown in the output circuit in FIG. 2. As explained previously, a capacitor 48 may be included with the resistor 47 if desired. As will be explained, currents of either polarity may flow through resistor 47. A signal corresponding to a positive current through resistor 47 is coupled through transistor 62 to the positive output bus 64 and a signal corresponding to a negative current through resistor 47 is coupled through transistor 65 to the negative output bus 66. Pulses on the respective buses 64 and 66 are coupled to ground through output resistors 68 and 69, and all signals from the various pairs of modules are taken from the output terminal $+e_o$ or $-e_o$, depending upon their polarities.

Figure 4:
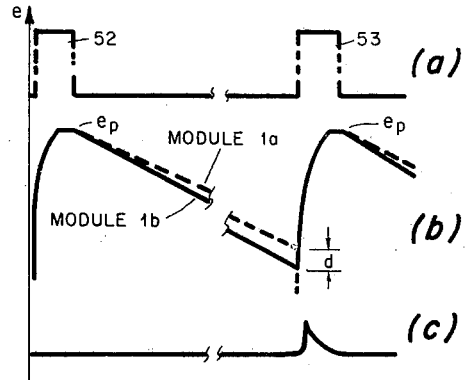
FIG. 4 is a series of waveforms that are referred to in describing the operation of the circuit of FIG. 3.

The detailed operation of the balanced circuit arrangement of FIG. 3 will be explained with the aid of the waveforms of FIG. 4. It will be assumed that the timing sequence begins immediately prior to the occurrence of the first charging pulse 52 of waveform 4a and that an imperfection such as a hole has just entered the region 30, FIG. 1, so that the light reflected along path 31 onto photosensitive detector 21 in module 1a will be of reduced intensity relative the the light reflected to photosensitive detector 22 from the region 32 in which there are no imperfections.

Charging pulse 52 of waveform 4a is applied to the input terminals 55, and because of the balanced arrangement of the input circuit, a positive polarity pulse is applied to module 1a and a negative polarity pulse is applied to module 1b. The charging current that flows through the charging capacitor in module 1a flows through diode 44a, through the module 1a, and through resistor 47 to ground. The charging current that flows through the charging capacitor in module 1b flows from ground, through resistor 47, through diode 44b, and through module 1b. It may be seen that the two charging paths are in opposite directions through resistor 47. If the charging currents are equal, no voltage develops across resistor 47, but if the charging currents applied to the two modules are of different magnitudes, the current through resistor 47 is equal to the instantaneous difference between the two charging currents and an output voltage is developed.

This may be illustrated by referring to FIG. 4b wherein the charging pulse 52 charges both charging capacitors of modules 1a and 1b to their peak voltages $e_p$. Because less light is reflected onto the photosensitive detector in module 1a than onto the photosensitive detector in module 1b, the rate of discharge established by the discharge path in module 1a is less than the discharge rate established by the discharge path in module 1b, as is illustrated by the waveforms of FIG. 4b. The discharge of the charging capacitors in modules 1a and 1b continues throughout the interpulse interval so that at the conclusion of the interval the charges on the two capacitors in the respective modules differs by an amount proportional to "d." Upon the occurrence of the next succeeding charging pulse 53, the charging capacitors in the modules 1a and 1b both are charged back to the peak voltage $e_p$, but because the charges added to the capacitors of the two modules differ in magnitude by a quantity proportional to "d," a current flows through resistor 47 whose magnitude is proportional to "d," as illustrated in FIG. 4c. The corresponding output signal then is coupled through transistor 62 to the output terminal $+e_o$.

The other pairs of modules 2a, 2b and 3a, 3b function in a similar manner in response to the light reflected onto their photosensitive detectors from respective regions across the width of the moving web 10.

Had the detected defect on the web 10 been a bright spot rather than a hole, more light would have been reflected to solar cell 21 than to solar cell 22, so that the charging capacitor in module 1a would have discharged at a faster rate than the charging capacitor in module 1b. In that situation, a current having a polarity opposite to that previously described would flow through resistor 47 and the output signal would appear at output terminal $-e_o$.

With the balanced arrangement illustrated in FIG. 3, environmental conditions will have little or no effect on the output signal. For example, fluttering of the moving web as it passes the inspection apparatus will affect both modules of a pair in a similar manner and the common effect will be cancelled out in the balanced arrangement.

In the apparatus illustrated in FIG. 1, the lens 28 and 29 are arranged so that the region 32 that is viewed by photosensitive detector 22 is located slightly in advance of the region 30 that is viewed by detector 21. This arrangement assures that an imperfection that extends an appreciable distance across the width of the web and that will intercept both the regions 30 and 32 will not cause simultaneous effects in the two modules that include the photosensitive detectors 21 and 22. This location of the regions 30 and 32 assures that in a situation as just described, a balanced circuit configuration as illustrated in FIG. 3 will produce an output signal.

The modules of a given pair, such as modules 1a and 1b, may receive light reflected from immediately adjacent regions on the moving web, or from regions that are considerably displaced from each other in a direction transverse to the direction of movement of the web.

In apparatus constructed as described above, I have successfully used for the photosensitive detectors solar cells that are commercially available. Other types of photosensitive detectors may be used if desired. The exact nature of the discharge path that is represented in FIG. 2 by transistor 36 and solar cell 21 may be altered in accordance with the type of photosensitive detector actually used. For example, if a photosensitive resistor is used as the light sensing element, this element alone may be connected in shunt across the charging capacitor to provide the light-sensitive discharge path. It also is obvious that radiant energy other than visible light could be employed in practicing the present invention. In the claims that follow, the term "transducer" is used to indicate the means that form the discharge path, and is intended to include any of the possible photosensitive devices, and any associated circuitry, that might be used.

What is claimed is:
1. Apparatus for inspecting a moving web, comprising
   (a) means for flooding with radiation an inspection area through which the web moves,
   (b) a plurality of pairs of radiation detectors disposed in an array that extends transversely of the direction of motion of the web, said detectors being directed to receive radiation from respective different regions of the portion of the web within said inspection area, said regions together covering the entire width of said inspection area,
   (c) a pair of capacitors for each said pair of radiation detectors, the capacitors of each pair being substantially identical,
   (d) a source of recurrent charging pulses,
   (e) means for applying said charging pulses to said capacitors,
   (f) means including a respective one of said radiation detectors for discharging each of said capacitors at a rate dependent upon the intensity of radiation received by said respective radiation detector, but insufficient to completely discharge any said capacitor during the interval between said charging pulses, and
   (g) means for producing an output signal in response to inequality of residual charges on the capacitors of any pair of said pairs of capacitors at the end of each interval between said charging pulses.

2. The invention set forth in claim 1, wherein laterally adjacent regions viewed by respective radiation detectors are slightly displaced with respect to each other in the direction of web motion.

3. The invention claimed in claim 1, wherein the repetition frequency of said charging pulses is so related to the speed of the web that each elemental region of said web is within view of one of said radiation detectors during at least one full pulse repetition interval.

4. The invention claimed in claim 3, wherein the duration periods of said charging pulses are approximately one percent of the pulse repetition intervals.

References Cited

UNITED STATES PATENTS

| | | | |
|---|---|---|---|
| 3,322,024 | 5/1967 | Preston | 250—219 |
| 3,427,461 | 2/1969 | Weckler | 250—211 |

RALPH G. NILSON, Primary Examiner

M. ABRAMSON, Assistant Examiner

U.S. Cl. X.R.
250—220